Jan. 10, 1950    A. G. THOMAS    2,493,903
AUTOMATIC ROASTER
Filed Jan. 15, 1945
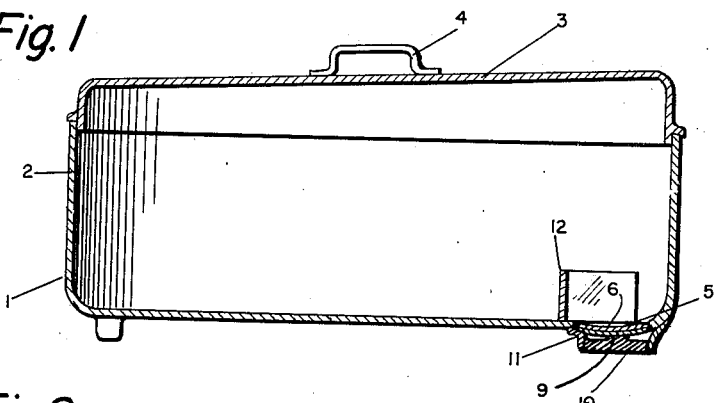
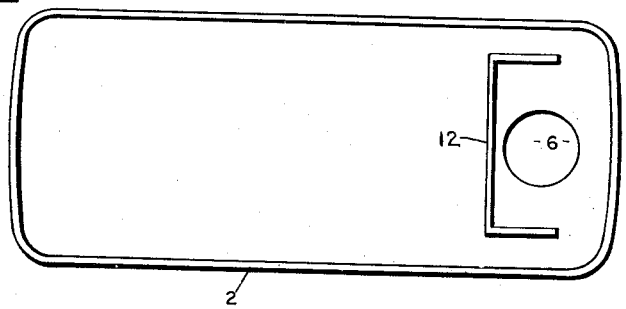
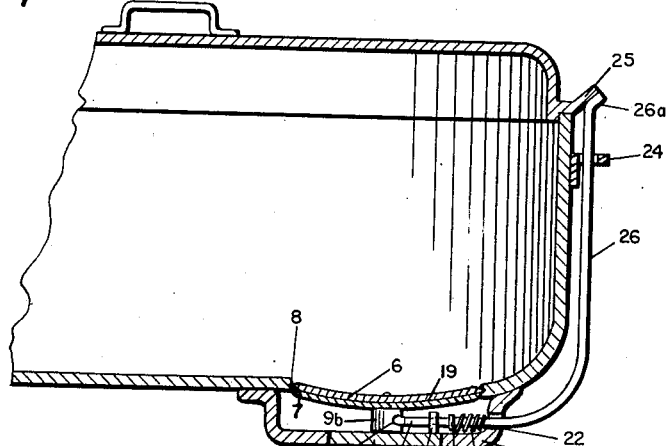
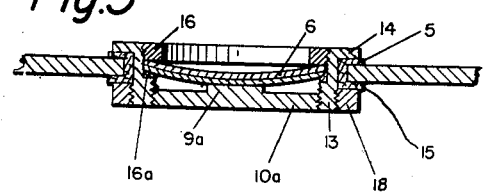
Inventor
Albert G. Thomas Patented Jan. 10, 1950

2,493,903

UNITED STATES PATENT OFFICE 2,493,903

AUTOMATIC ROASTER

Albert G. Thomas, Lynchburg, Va.

Application January 15, 1945, Serial No. 572,824

6 Claims. (Cl. 99—346)

This invention relates to cooking vessels for roasting meats, fowl, etc., and commonly known as roasters. The simplest form of roaster is merely a deep pan provided with a tightly-fitting cover. However, even these rudimentary roasters usually incorporate some design features which are intended to facilitate the basting process, i. e. carrying of water or condensed vapors produced during cooking to the exposed surface of the roast. Basting is quite desirable since it helps to retain the natural flavor, moisture and tenderness of the meat and results in a superior roast.

A widely followed practice is to raise the cover several times during the cooking period, dip up the quantity of the cooking liquid, which may be water, meat juices, or a combination thereof, from the pan and pour it over the roast. In addition to additional burdening of the cook who is likely to neglect more or less the basting operation, the necessary opening of the oven and removal of the roaster cover cools the exposed surface of the roast and results in uneven cooking and a lengthening of the cooking interval.

For the above reasons as well as others which will be apparent it is recognized that automatic basting, which requires no attention whatever during the cooking period, is most desirable. This is true regardless of the source of cooking energy whether gas, electricity, or the equivalent. Various arrangements have been proposed in the prior art for accomplishing automatic basting. Without enumerating the attendant advantages and disadvantages of prior designs, it is sufficient here to note that no automatic baster has been available, possessing the simplicity, effectiveness, ease of cleaning, and low cost necessary to win wide public acceptance.

It is the primary object of this invention to provide an automatic self-basting roaster exemplifying in high degree the desirable features just named.

Another object of this invention is to provide a roaster of the automatic, self-basting type in which the baster is made operative or inoperative depending on whether the roaster cover is in place or removed.

Another object is to provide an automatic baster in which the operative parts within the roaster are shielded from contact with or obstruction by the roast.

Other objects and advantages of my invention will be apparent as this description proceeds and by reference to the accompanying drawings in which;

Figure 1 is a side view in section of one form of my invention;

Figure 2 is a view of Figure 1 looking from above and with the cover removed;

Figure 3 is an enlarged, sectional view of a modified thermostatic element and its mounting in the roaster; and Figure 4 is a fragmentary side view, in section, of a roaster with another form of my invention.

Referring now to Figure 1 there is shown generally at 1 a roaster having a lower pan 2 and a cover 3 which is preferably longitudinally inclined, and usual lifting handle as shown at 4. In the wall of the lower pan 2, preferably in the bottom portion and beneath the upper end of the inclined cover 3 there is provided an aperture 5 which is closed by a bimetallic disk 6 peripherally mounted therein in any suitable manner. Other bimetal shapes may be used however. Such mounting may be as shown in Figure 4 for example, wherein the periphery of disk 6 is tapered at 7 to nest within a complementary recess 8 formed in the rim of aperture 5. A requirement of the mounting, it will be observed, is that the bimetallic disk 6 may be free to snap to its upper position and return to its lower position as shown in Figure 1 in response to a temperature differential existing between the inside and outside of the roaster 1. In order to increase the transfer of heat from the oven to the bimetallic disk 6, a button or strip 9 of good heat conductivity such as silver or alloy, is suitably affixed to the central portion thereof and in the relation of the parts shown in Figure 1 rests on a heat conducting plate 10 of silver, copper alloy, copper, or the like. Plate 10 is welded or otherwise fastened to frame 11 which is welded, bolted or riveted to pan 2. A baffle 12 disposed about the aperture 5 and serving to shield the disk 6 from obstruction by the roast (not shown) to the left thereof (Figure 1) may be fixed to the bottom wall of the lower pan but is preferably movably positioned therein as indicated.

As has been stated hereinbefore, the operation of my self-baster is dependent on the temperature differential between the outside and the inside of the roaster during the cooking period. Tests which I have conducted establish that this differential is ample to effect a frequent movement of the bimetal disc 6 upward, as its temperature increases due to oven temperature and downward again when it has been cooled by the lower temperature within the roaster.

When button 9 rests against plate 10 it absorbs heat and conducts it to bimetal element 6 which snaps upward, thereby throwing liquid, on the pan bottom over the roast, and up to the inner surface of cover 3. The liquid or juice trickles down the incline and drops off onto the meat at various points. Suitable channels or guides can be formed in the top. After an interval the bimetal element cools, since the inside of the roaster is much cooler than the outside, and the bimetal element snaps back to the position shown. Plate 10 serves as a means for conducting heat to the bimetal element when in contact therewith, and it also serves as a heat guard to shield the bimetal element from heat outside the pan after the bimetal element has snapped out of contact with plate 10. Since any heat transmission to the bimetal element 6 from plate 10 is at a much lower rate when the element and plate are separated than when they are in contact, the bimetal element 6 is cooled by the cooler liquid when the element is separated from the plate, so that the bimetal element snaps back into contact with plate 10.

In Figure 3 I have shown a readily detachable, thermally insulated mount for the bimetallic disk incorporating certain refinements over the construction shown in Figure 1. A threaded ring 13 having a shoulder 14 is snugly encircled by an annular, thermally-insulating gasket 15 such as asbestos, within the aperture 5 and receives the bimetallic disk 6 which is maintained in position by the inner threaded ring 16 screwed into ring 13 and the shoulder 16a formed in that ring. Disk 10a, of silver alloy, copper, or the like is thickened centrally at 9a to provide a heat conducting contact similar in function to contact button 9 of Figure 1 and is threaded into ring 13, the lower outer surface of which is also threaded. A threaded outer ring 18 serves to secure the ring 13 in engagement with gasket 15. In addition to shielding the disk from direct heat transfer from the wall of lower pan 2, the gasket and threaded mounting of Figure 3 facilitate quick assembly, disassembly and replacement of the disk 6 and its retainers, and tends to prevent leakage. In this case disk 6 comes directly in contact with disk 10a.

In Figure 4 is shown the substantial embodiment of Figure 1 but with the addition of a lockout device arranged to lock the bimetallic disk 6 in its lower position when the cover 3 is removed. This feature eliminates all danger of the disk snapping to its upper position and throwing hot liquid out of the roaster when the cover is removed, as for inspection at the close of the cooking period. In Figure 4 frame 11 is provided with an insert disc 10b which is preferably welded thereto and is shown touching heat conducting button 9b which may be welded or riveted to bimetallic disk 6 centrally thereof, flexibility being maintained. The side wall of button 9b is laterally recessed to provide a socket 19 adapted to receive a pin 20 guided by upright 21 which is fixed to disk 10b. Pin 20, it will be observed, is the terminus of a curved rod 26 which extends through an aperture 22 in the frame 11 and is biased inwardly by a spring 23 surrounding rod 21 and bearing against a stop 24 fixed to the rod. The upper end of rod 26 is guided by a laterally slotted bracket 24 fixed to the wall of the lower pan and has an angular termination 26a adapted to be engaged and moved outwardly by the flange or projection 25 of the cover 3 when the latter is in place as shown in Figure 4. When the cover 3 is removed, spring 23 will move rod 26 and its pin 20 to the left into locking relation with the button 9b and thus prevent upward movement of disc 6. Socket 19 may be formed as an angular groove extending completely around the disk 9b to ensure engagement by the pin 20 regardless of partial rotation of disk 6 in its mounting during use, if the disk is not welded.

As shown in Figure 1 the cover 3 is preferably inclined downwardly from the portion opposite the bimetal disc mounting so that the liquid thrown vertically upward against the cover will flow downwardly to the lower end of the cover. The inclined cover may be provided with various expedients to insure a constant and uniform dripping of liquid to the roast. Spaced dome-shaped projections in the cover, as commonly used, will be found satisfactory.

Frame 11 is preferably of steel or other material of lesser heat conductivity than that of disks 10, 10a, or 10b. The frame can be of glass if desired. This is to prevent unnecessary transfer of heat to the bimetal element when it is in its "up" position. The bimetal perimeter or the frame, or both, may make liquid tight contact with pan 2. The thermostatic element may be placed in a well or inclined at an angle to provide best basting action.

Since the oven temperature is often as much as 100 degrees F. higher than the temperature in the roaster, the bimetal element will absorb heat readily from the elements 10, 10a, or 10b and will become relatively cool when out of contact with one of the elements. This results in a periodic upward and downward snapping of the bimetal element so that meat juice or other liquid is thrown over the roast during most of the cooking period.

It is obvious that other types of thermally responsive elements might be used and many other changes of detail can readily be made without departing from the scope of this invention as defined in the appended claims.

I claim:

1. An automatic self-basting roaster comprising a lower pan adapted to receive roast and liquid, a cover for said pan, thermostatically operated means mounted in said pan for projecting liquid upwardly from said pan for basting said roast, and locking means for rendering said first means ineffective when said cover is removed.

2. In a roasting pan, a snap-action bimetal element comprising a portion of a bottom surface of said pan and arranged to snap in a direction to throw liquid in said pan onto meat placed therein, when said element absorbs sufficient heat, said pan including a metal part positioned to be struck by said bimetal element to supply heat to said element after it snaps into contact with said part as a result of being cooled by said liquid, said metal part serving as a heat guard between said bimetal element and a source of heat outside said pan, after said bimetal element has snapped out of contact with said metal part.

3. In a roasting pan, a snap-action bimetal element associated with a surface of said pan to receive heat therefrom to cause said element to snap in a direction to throw liquid in said pan onto meat therein, and heat insulation means supporting said element out of metallic contact with said pan after said element has snapped in said direction, so that said element will be cooled by said liquid to snap into contact with said surface again, in repeated cycles, said surface serving as a heat guard between said bimetal element and a source of heat outside said pan, after said bimetal element has snapped out of contact with said surface.

4. In a rotating pan, an opening in the bottom of said pan, heat insulation means fastened to said pan adjacent said opening, snap-action bimetal means for throwing fluid in said pan onto meat contained therein, said bimetal means being supported by said heat insulation means so that said bimetal means is out of metallic contact with said pan when said bimetal means is snapped in a direction away from an adjacent portion of said pan, a metal element carried by said pan and positioned to limit movement of said bimetal means after said means snaps against said metal object as a result of being cooled by said liquid, a metal element carried by said pan and positioned to limit movement of said bimetal means after said means snaps against said metal element as a result of being cooled by said liquid.

5. In a roasting device, a pan for holding meat and liquid, a snap-action heat responsive element comprising a portion of the bottom of said pan and arranged to snap in a direction to throw liquid in said pan onto said meat when said element receives sufficient heat, a part of said pan extending therebelow to form a well beneath said heat responsive element, said part being arranged to stop the snapping movement of said heat responsive element toward said part resulting from cooling of said element by said liquid and said part serving to impart heat to said element to cause it to snap in a direction away from said part.

6. In a device for moving liquid, a snap-action bimetal element in contact with said liquid, means supporting said element for snap action, and a metal element of good heat conductivity comprising a part of said device and positioned to stop the travel of said bimetal element when snapping over due to cooling by said liquid, said part serving to supply said bimetal element with heat from a source to cause the element to snap in opposite direction to move said liquid.

ALBERT G. THOMAS.

REFERENCES CITED

The following references are of record in the file of this patent:

UNITED STATES PATENTS

| Number | Name | Date |
|---|---|---|
| 910,318 | Schaefer | Jan. 19, 1909 |
| 1,167,775 | Miller | Jan. 11, 1916 |
| 1,245,712 | Harper | Nov. 6, 1917 |
| 1,349,302 | Spitz | Aug. 10, 1920 |
| 1,582,685 | Pence | Apr. 27, 1926 |
| 1,687,099 | Laun | Oct. 9, 1928 |
| 1,767,709 | Smith | June 24, 1930 |
| 1,947,232 | Smith | Feb. 13, 1934 |
| 1,977,486 | Louis | Oct. 16, 1934 |
| 2,111,609 | Bolesky | Mar. 22, 1938 |
| 2,141,775 | Varley | Dec. 27, 1938 |
| 2,196,393 | Ireland | Apr. 9, 1940 |
| 2,329,116 | Heilman | Sept. 7, 1943 |
| 2,342,108 | Appleman | Feb. 22, 1944 |
| 2,402,997 | Grayson | July 2, 1946 |